US008731905B1

United States Patent
Tsang et al.

(10) Patent No.: US 8,731,905 B1
(45) Date of Patent: May 20, 2014

(54) SYSTEM AND METHOD FOR ENHANCING COMPREHENSION AND READABILITY OF TEXT

(71) Applicant: Quillsoft Ltd., Toronto (CA)

(72) Inventors: Vivian Tsang, Toronto (CA); David Jacob, Toronto (CA); Fraser Shein, Toronto (CA)

(73) Assignee: Quillsoft Ltd., Toronoto, Ontario (CA)

( * ) Notice: Subject to any disclaimer, the term of this patent is extended or adjusted under 35 U.S.C. 154(b) by 0 days.

(21) Appl. No.: 14/131,838

(22) PCT Filed: Feb. 22, 2013

(86) PCT No.: PCT/CA2013/000158
§ 371 (c)(1),
(2), (4) Date: Jan. 9, 2014

(87) PCT Pub. No.: WO2013/123583
PCT Pub. Date: Aug. 29, 2013

Related U.S. Application Data (60) Provisional application No. 61/601,766, filed on Feb. 22, 2012.

(51) Int. Cl.
*G06F 17/27* (2006.01)
(52) U.S. Cl.
USPC .................................. 704/9; 704/4; 704/257
(58) Field of Classification Search
USPC ............... 704/1–10, 251, 255, 257, 270, 277; 382/177; 345/471; 1/1
See application file for complete search history.

(56) References Cited

U.S. PATENT DOCUMENTS

| | | | |
|---|---|---|---|
| 5,724,498 A * | 3/1998 | Nussbaum | 345/471 |
| 5,802,533 A | 9/1998 | Walker | |
| 6,130,968 A | 10/2000 | McIan et al. | |
| 7,069,508 B1 | 6/2006 | Bever et al. | |
| 7,159,172 B1 | 1/2007 | Bentley et al. | |
| 7,490,092 B2 * | 2/2009 | Sibley et al. | 1/1 |
| 7,743,324 B1 | 6/2010 | Bever et al. | |
| 7,765,471 B2 | 7/2010 | Walker | |
| 7,861,163 B2 | 12/2010 | Walker | |
| 8,385,652 B2 * | 2/2013 | Mitic | 382/177 |
| 2008/0141126 A1 | 6/2008 | Johnson et al. | |
| 2010/0037132 A1 | 2/2010 | Lopucki | |

OTHER PUBLICATIONS

Cunningham, "Understanding Synthetic Speech and Language Processing of Students with and Without a Reading Disability," http://hdl.handle.net/1807/31728, pp. 1-163, Nov. 2011.

* cited by examiner

*Primary Examiner* — Huyen X. Vo
(74) *Attorney, Agent, or Firm* — Kagan Binder, PLLC (57) ABSTRACT

The present invention is a text display system with speech output that uses a method of text segmentation in which segments of text are presented one after another for reading text sequentially. To indicate the location of text a user is currently reading, the current sentence is emphasized by presenting the surrounding text in faded colors. The current sentence is segmented into phrases where the points of segmentation are chosen by a series of grammatical rules and the desired number of words in each segment. When the text is presented sequentially, each segment is highlighted within the current sentence. With the use of a text-to-speech output system, each segment is spoken out with a pause before the next segment is presented. In a non-linear/selective reading scenario, a user can select a text segment, for which the span of the segment can be automatically generated or manually selected by the user.

20 Claims, 9 Drawing Sheets

The astonishment of the ladies was just what he wished; that of Mrs. Bennet perhaps surpassing the rest; though, when the first tumult of joy was over, she began to declare that it was what she had expected all the while.

"How good it was in you, my dear Mr. Bennet! But I knew I should persuade you at last. I was sure you loved your girls too well to neglect such an acquaintance. Well, how pleased I am! and it is such a good joke, too, that you should have gone this morning and never said a word about it till now."

"Now, Kitty, you may cough as much as you choose," said Mr. Bennet; and, as he spoke, he left the room, fatigued with the raptures of his wife.

Fig. 2a

The astonishment of the ladies was just what he wished; that of Mrs. Bennet perhaps surpassing the rest; though, when the first tumult of joy was over, she began to declare that it was what she had expected all the while. [12]

[11]

"How good it was in you, my dear Mr. Bennet! But I knew I should persuade you at last. I was sure you loved your girls too well to neglect such an acquaintance. Well, how pleased I am! and it is such a good joke, too, that you should have gone this morning and never said a word about it till now." [10]

"Now, Kitty, you may cough as much as you choose," said Mr. Bennet; and, as he spoke, he left the room, fatigued with the raptures of his wife.

[17] *"your girls too well to neglect"*

[18] " " ...

sure you loved your girls too well to neglect such an acquaintance.

The astonishment of the ladies was just what he wished; that of Mrs. Bennet perhaps surpassing the rest; though, when the first tumult of joy was over, she began to declare that it was what she had expected all the while.

"How good it was in you, my dear Mr. Bennet! But I knew I should persuade you at last. I was sure you loved your girls too well to neglect such an acquaintance. Well, how pleased I am! and it is such a good joke, too, that you should have gone this morning and never said a word about it till now."   [19]

"Now, Kitty, you may cough as much as you choose," said Mr. Bennet; and, as he spoke, he left the room, fatigued with the raptures of his wife.

Fig.3a

The astonishment of the ladies was just what he wished: that of Mrs. Bennet perhaps surpassing the rest; though, when the first tumult of joy was over, she began to declare that it was what she had expected all the while.

"How good it was in you, my dear Mr. Bennet! But I knew [21] "that you should have gone" I was sure you such an acquaintance. How pleased I am! and it is such a good joke, too, that you should have gone this morning and never said a word about it till now." [20]

"Now, Kitty, you may cough as much as you choose," said Mr Bennet; and, as he spoke, he left the room, fatigued with the raptures of his wife.

Fig. 3b

"How good it was in you, my dear Mr. Bennet! But I knew I should [24] was sure you loved yo  "it is such a good joke" such an acquaintance. We pleased I am! and is such a good joke too, that you should have gone this morning and never said a word about it till now." [23]
[22]

Fig. 3c

SYSTEM AND METHOD FOR ENHANCING COMPREHENSION AND READABILITY OF TEXT

RELATED APPLICATION

This application claims the benefit from International Application No. PCT/CA2013/000158, filed Feb. 22, 2013, which in turn claims the benefit of U.S. Provisional Patent Application Ser. No. 61/601,766, filed Feb. 22, 2012, which applications are incorporated herein by reference in their entireties

FIELD OF THE INVENTION

The present invention relates generally to computerized text presentation, and more particularly to computerized text presentation based on text segmentation.

BACKGROUND OF THE INVENTION

Traditional typesetting practices (involving movable type) involve a mechanical arrangement of types to be printed on paper. Such arrangement includes a selection of typefaces, type size, and spacing between letters and line. With the advent of computers and word processing software, typesetting has become mostly automated. As such, users of modern word processing software rarely adjust the typesetting beyond font selection and line spacing.

As the resolution and quality of computer displays has increased, the display of text has approached the resolution and quality of type on paper. Studies have been done to examine the impact of various typographical features on the legibility, readability and comprehension of written material, in print or on screen. Academic debates on the best practices are on-going. Nevertheless, by and large, practices from the past several hundred years of printing typography remain state-of-the-art. In some cases, these printing practices are carried over to electronic reading devices, while in other cases they are neglected.

As individuals desire to read large amounts of text and data, often from disparate sources and often under time pressures (real or perceived), traditional practices of displaying textual information are often deemed to be insufficient. To address this need, inventors have developed methods of displaying information using computer-based systems outside of typographical traditions. One of the first alternative views was called "fisheye" in which the foremost content of interest is enlarged or shown in great detail while the adjacent content, often just landmarks, is reduced in size proportionally as distance increases. This enables the user to perceive the entire content while focusing on the salient content.

There have been many attempts at facilitating quick browsing or skimming without reading the whole text. Generally, methods relate to applying focus on salient units of text (typically keywords) within a typical textual layout by making these units stand out visually (by modifying the font or highlighting), and in some cases obscuring/defocusing the non-salient text. Text summarization methods have also been developed in an attempt to reduce the quantity of text to be read and these methods continue to be a major area of academic pursuit.

Alternative presentation formats have gone as far as eliminating the traditional format entirely and presenting text sequentially one or a few words at a time, at a user-adjustable rate, in a speed-reading fashion. Here, the intent is to eliminate all but the most immediately salient word(s).

In all of these alternative text presentations, the underlying assumption is that the reader is fully literate and able to read the displayed text. Irrespective of these alternative text presentations and the best typographical practices, there still remain a large number of individuals for whom reading is difficult, whether on paper or on an electronic display. There are many reasons for this that impact the type of solution that is most appropriate.

Beginning in the 1980s, the field of assistive technology for persons with disabilities regularly began using text-to-speech or synthetic speech to read computer-based text aloud, primarily for communication purposes for non-speaking persons. In the 1990s, this same technology became popular in the field of education to assist persons with learning disabilities particularly in conjunction with word prediction technology. In addition to visually adjusting the text itself, the linking of speech output to the text became commonplace to aid in the reading of text. In particular, word-by-word highlighting synchronized with synthesized speech (text-to-speech) became the accepted norm. Research in the 90s provided evidence that speaking text with word-by-word highlighting was more effective in improving reading by persons with learning disabilities than reading plain text alone.

The method of highlighting text either by whole sentence or by individual words and having it spoken aloud with the aid of synthesized speech is now commonplace in reading applications for consumer computer systems (including tablet-style) and standalone electronic devices such as eReaders and other reading/learning devices.

SUMMARY OF THE INVENTION

It is an object of the invention to provide a system and method to enhance comprehension and readability of text by presenting the text to a user as a sequence of segments that allows the user to focus on one segment at a time.

The present invention provides a method of parsing a sentence into a sequence of phrasal segments performed by a computer processor, the method comprising the steps of:
 (a) providing a target segment length expressed as a number of words or syllables;
 (b) parsing the sentence to identify candidate break points based on punctuation and parts of speech and including candidate break points at the beginning and end of the sentence;
 (c) eliminating candidate break points, leaving a plurality of final break points, so that every word in the sentence is situated between two final break points and the sum of the differences between (i) the target segment length and (ii) the number of words, if the target segment length is expressed as a number of words, or the number of syllables, if the target segment length is expressed as a number of syllables, between each consecutive pair of final break points is minimal; and
 (d) identifying each sequence of words between each consecutive pair of final break points as a segment.

The parsing of the sentence may be performed based on a grammar.

The parsing step may comprise identifying words that are conjunctions, verbs and prepositions, and the parsing of the sentence may comprise placing candidate break points at the beginning of the sentence, at punctuation marks in the sentence, and before and after each word identified as a conjunction, verb or preposition.

The parsing step may comprise a first sub-step of pre-processing the sentence to break it into fragments based on mid-sentence punctuation marks and including candidate break points at the beginning and end of each fragment, and a second sub-step of parsing each fragment to identify candidate break points based on punctuation and parts of speech.

Candidate break points may be removed from before and after a conjunction, verb or preposition if the conjunction, verb or preposition is situated within a phrase that should not be broken. It may be that a phrase should not be broken if it is in a pre-determined set collected from external lexicographical sources.

The present invention also provides a method for parsing a document, the document comprising one or more than one paragraph, each paragraph comprising one or more than one sentence, into a sequence of phrasal segments performed by a computer processor, the method comprising the steps of:
 (a) parsing the document into paragraphs based on paragraph breaks;
 (b) parsing the paragraphs into sentences based on punctuation; and
 (c) parsing each sentence into a sequence of phrasal segments as described above.

The present invention also provides a method of reading a document to a user performed by a computer processor, the method comprising the steps of:
 (a) parsing the document into a sequence of phrasal segments using the methods described above and identifying one segment as a current segment;
 (b) instructing a text-to-speech engine to read the current segment aloud to the user;
 (c) pausing for a pre-determined duration after the current segment has been read;
 (d) setting the current segment to be the next segment in the sequence; and
 (e) repeating steps (b), (c), and (d) until all segments have been read or until the user instructs the processor to stop.

The duration of each pause may be selected to be discernibly longer than the average pause between words. The duration of each pause may be at least 500 milliseconds. Alternatively the minimum duration of a pause may be anywhere between 100 and 500 milliseconds. The duration of each pause, other than the pauses between sentences, may be the same. Alternatively all pauses may have the same duration, or the duration of each pause may vary based on the attributes of the preceding segment.

The current segment may be displayed to the user while the text-to-speech engine reads the current segment.

A sentence, being the current sentence, containing the current segment may also be displayed, and the current segment may be highlighted to differentiate it from the remainder of the current sentence.

At least a portion of a paragraph, being the current paragraph, containing the current segment may also be displayed, and the current sentence may be highlighted to differentiate it from the remainder of the current paragraph.

A portion of the text preceding the current paragraph in the document may be displayed before the current paragraph, and the current paragraph may be highlighted to differentiate it from the text preceding the current paragraph.

A portion of the text following the current paragraph in the document may be displayed after the current paragraph, and the current paragraph may be highlighted to differentiate it from the text following the current paragraph.

In general, the current segment may be highlighted to be most prominent.

The reading of text by the text-to-speech engine may be muted, in a teleprompter mode, so that no words are sounded.

The invention also includes systems comprising a programmable computer processor and a display, the processor running software adapted to perform the methods described above.

The invention also includes a non-volatile computer-readable memory on which is stored software instructions adapted to run on a computer processor to cause the processor to perform the methods described above.

DETAILED DESCRIPTION OF THE INVENTION

In view of the foregoing, and with modern typesetting practices being largely automated and standardized, notwithstanding the legibility issues being partially an issue of aesthetic choice, grouping coherent units visually or via speech can improve readability and comprehension of text. First, coherent semantic units should be visually coherent as well. Traditionally, one can employ the use of a physical highlighter to visually mark the coherently salient set of words, or alternatively, letter grouping or other font changes to increase emphasis, but the process can be laborious and depends on good reading skills. The other considers the use of synthesized speech output to augment the reading that emulates the visual recognition of coherent units through the listening route. This is intended to mimic a good public speaker, where pauses are inserted in places that are not necessarily standard clauses, but rather mid-clause break points, for phrasing, emphasis and provision of time for the comprehension of what has just been said. Neither of these features has been automated previously and yet can be implemented for reading on screen.

A preferred embodiment of the invention comprises methods implemented in software that runs on a programmable computer processor. The invention also includes systems comprising a programmable computer processor running software adapted to perform these methods.

Figure 1A:
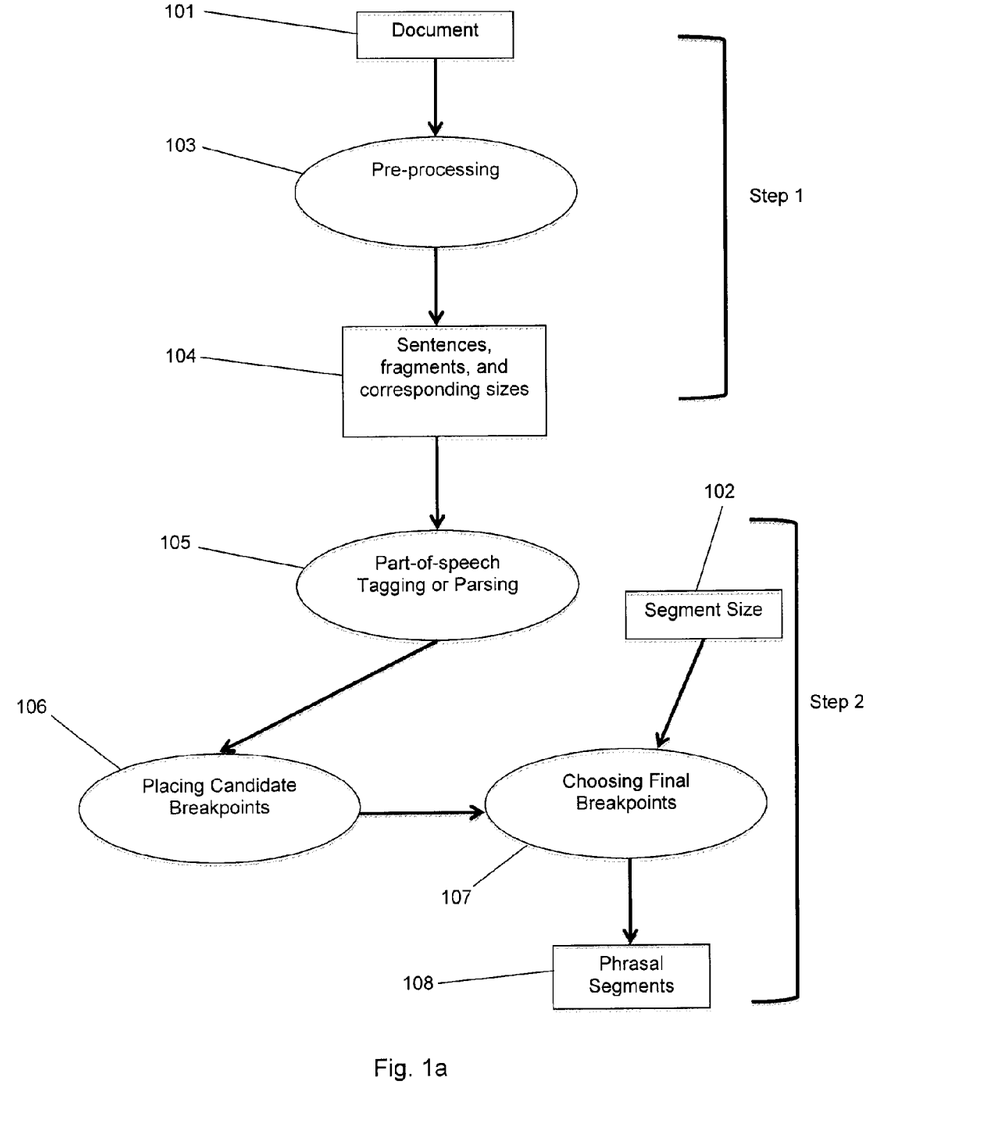
FIG. 1a is a block diagram showing the steps of sentence segmentation.

FIG. 1a illustrates the high-level steps employed to segment a document 101 into a sequence of phrasal segments 108. The algorithm employs two major steps, identified as step 1 and step 2 in FIG. 1a. Step 1 is the pre-processing 103 of an input document 101 to create a set of sentences 104 based on a predefined set of sentence markers. For example, a period, question mark or exclamation mark may be used to identify the end of a sentence in English.

During pre-processing 103, each sentence may be broken up into smaller fragments 104 if there are mid-sentence punctuation marks such as commas, colons, and semi-colons. In general, contiguous portions of a sentence not having any such punctuation may be identified as sentence fragments or portions.

The second step is to further segment each sentence portion into smaller phrasal segments 108. This involves placing candidate break points 106 at the beginning and end of each sentence and between certain words in the sentence, and then choosing final breakpoints 107 from those candidate break points, taking into account a pre-defined target segment size 102, or segment length. The target segment length is generally expressed as a number of words, although in some embodiments it may be expressed, for example, as a number of syllables.

Candidate break points are placed at the beginning and end of each sentence portion. Candidate break points within each sentence portion may then be chosen by parsing the sentence. One way to do this is by analyzing each word in context to determine what part of speech it is. In order to identify phrasal segments 108, the algorithm may attempt to identify parts of speech such as conjunctions, verbs, and prepositions because these parts of speech typically mark the inclusion of new information. Each word may be assigned a probability that it is each part of speech (e.g. conjunction, verb, preposition, noun, adverb, etc.) and then the word may be tagged as the part of speech having the highest probability. Suitable algorithms to perform this analysis and assign such a probability are well known to skilled persons. In general, a conjunction signals a new clause, a verb signals an event or state information, and a preposition signals additional information on the subject or the verb, so that candidate break points may be placed before and after each target word tagged as conjunction, a verb, or a preposition.

A candidate break point may be removed from before and after a conjunction, verb or preposition if the candidate break point is situated within a phrase that should not be broken. Such phrases may be members of a pre-determined set collected from external lexicographical sources. Another condition for removing a candidate break point may be that the candidate break point is too close to a sentence fragment boundary, such as by being one or two words away from the boundary.

Where sufficient processing power is available, a more sophisticated parser may be employed based on a grammar, such as a lexical functional grammar. Grammatically correct sentences typically present an idea in the form of [subject] [verb phrase], where the verb phrase describes the details of an event or the state relevant to the subject. The verb phrase can be further broken down (grammatically) into smaller parts depending on the complexity of the event or state.

Such parsing also identifies, and can be used to tag, parts of speech, but it completely breaks a sentence into its constituent phrases and sub-phrases. Many such techniques are well-known to skilled persons. Candidate break points may be placed before an S-BAR (a clause within a sentence), VP (verb phrase), or PP (prepositional phrase). However, a parser may not correctly handle grammatically ill-formed text and may not select a sufficient number of candidate break points so as to lead to the most appropriate selection of final break points.

The final choosing of break points 107 is made by eliminating some of the candidate break points based on the pre-defined segment size 102. The predefined segment size 102 is considered to be the ideal number of words in each phrasal segment 108 for purposes of reading comprehension. It may depend on information provided to the system about the human user, or reader. For example, for a child the predefined segment size 102 may be set to three, but for normal adults, it may be set to five to seven words, depending on the person's abilities. Smaller or larger segment sizes may be appropriate in some situations.

If a sentence has twenty words and the preferred segment size is five, then in the ideal case there would be four segments of five words per segment. However, the selection of segments is constrained by the locations of the candidate break points so that the number of segments and the size of each segment do not generally correspond to the ideal case. The method employs an integer-partitioning algorithm to choose the final break points by eliminating candidate break points, thereby leaving a number of final break points, so that the sum total of the differences between the target segment size and the number of words between each consecutive pair of final break points is minimal. Two break points are considered to be consecutive if there is no other break point between those two break points Each sequence of words between each consecutive pair of final break points is then identified as a phrasal segment 108.

Figure 1B:
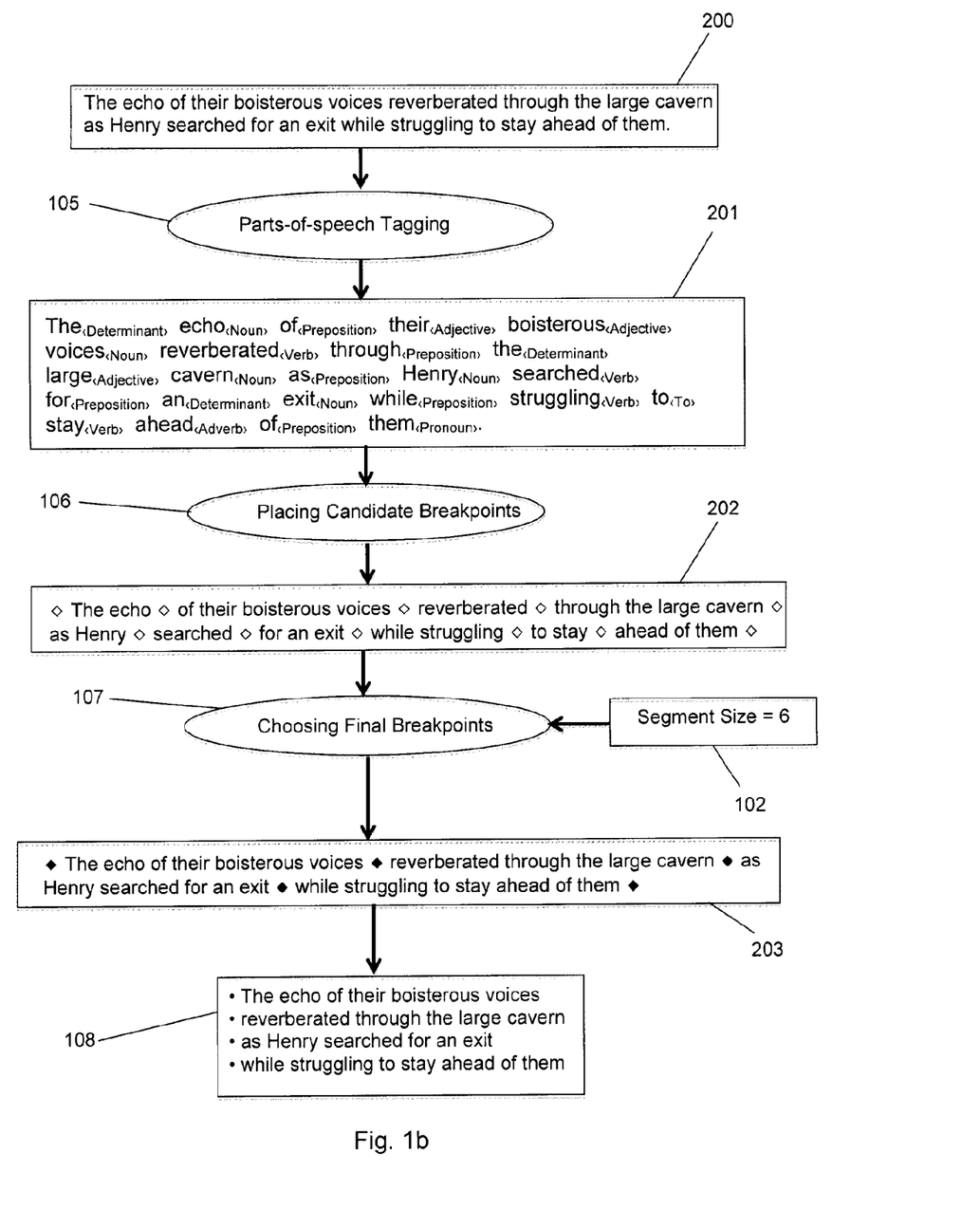
FIG. 1b is a diagram showing the segmentation of a sentence by way of example.

FIG. 1b illustrates by way of example the segmentation of a sentence 200 having 24 words into phrasal segments 108 according to step 2 of the segmentation process depicted in FIG. 1a, using a segment size 102 of six. The parts-of-speech tagging 105 assigns a tag to every word in the sentence 200 to form an augmented sentence 201. Candidate break points are then placed in the sentence, as described above, to produce a preliminarily segmented sentence 202, in this case having 11 candidate break points. Using the target segment size 102 of six, six candidate break points are then eliminated by choosing final breakpoints 107, leaving five final breakpoints in a finally segmented sentence 203. The phrasal segments 108 are then identified as each sequence of contiguous words between each consecutive pair of final break points, thereby resulting in four phrasal segments 108 having lengths of 6, 5, 6, and 7 words.

In some cases, there may be more than one solution that minimizes the total difference. In that case, one solution may be selected arbitrarily, or heuristics may be used. For example, the solution with the least variance in the differences may be selected (so if one solution has differences of 0, 0, 0, and 4, and another has differences of 1, 1, 1, and 1, the latter may be selected).

Figure 2A:
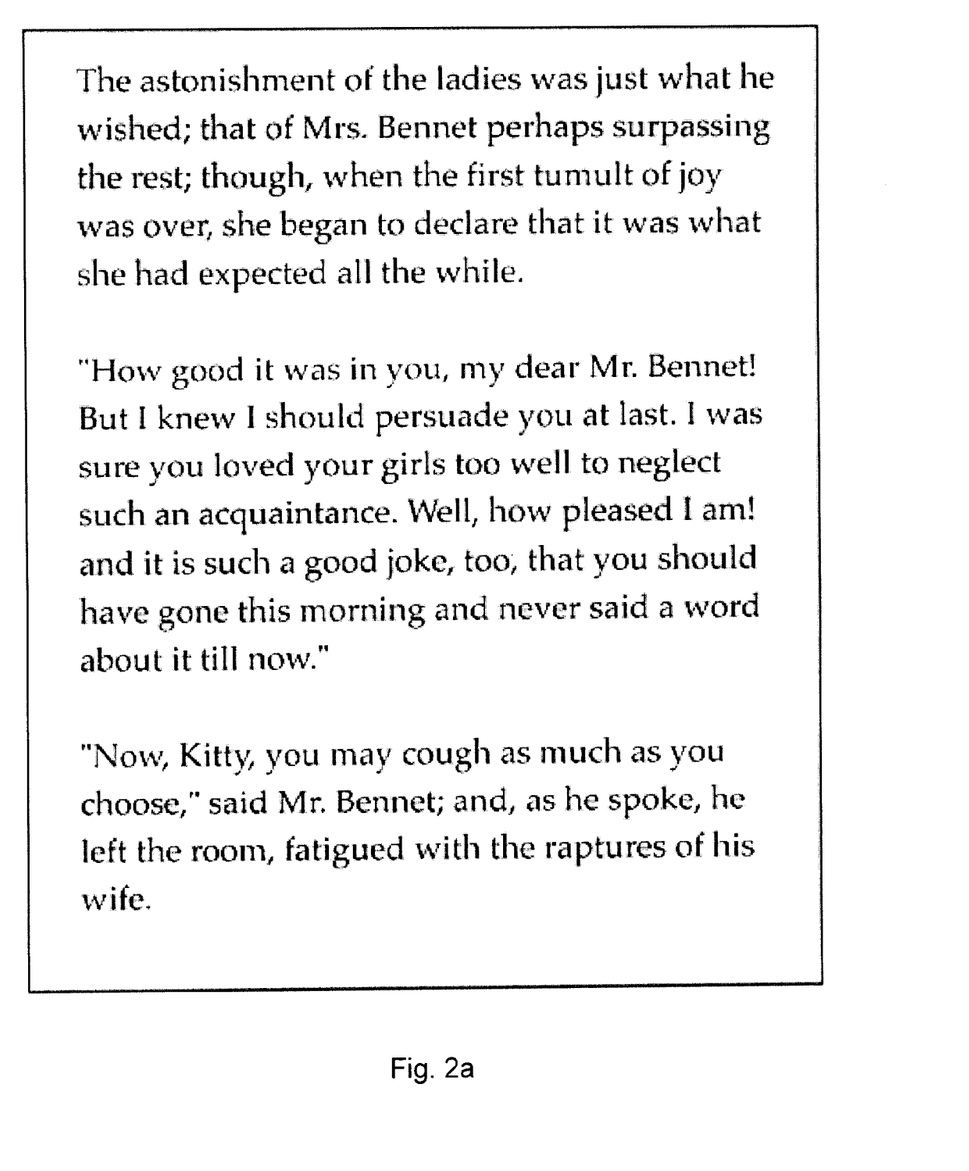
FIGS. 2a, 2b, 2c, 2d, 3a and 3b show a portion of text displayed by a processor with varying highlighting.

A processor may be adapted by software to use the segmentation of the text from a document into phrasal segments for various purposes. A system may employ the segmentation to highlight successive segments in the document for display to a user in sequence to facilitate the user reading the document. For example, the user may desire to read the text from a document, a portion of which is shown in FIG. 2a. The system may also employ a text-to-speech (TTS) engine, which are widely available. Such a TTS engine can be instructed by the system to convert one or a sequence of words into sounds that mimic how a person would speak the words so that they can be played aloud through acoustic speakers in electronic communication with the system. Such a TTS engine will speak the words provided to it at a rate, which may be adjustable, that is comparable to normal human speech. Rates of 120 to 180 words per minute are typical, although lower or higher rates may be suitable for some purposes.

By pausing between the completion of the speaking of one segment and the provision of the next segment to the TTS engine, the system can create a pause in the speech heard by the user. In addition to creating pauses between sentences, the system may also introduce a short pause of a pre-determined duration between phrasal segments. The pause between segments is generally chosen to be discernibly longer than the average pause between words, so that a normal user would recognize that the inter-segment pause is longer than the average pause or gap between other words in the sentence. It may be chosen, for example, to have a duration of 500 milliseconds, although longer pauses may be appropriate in some cases, for example between sentences. Shorter pauses may also be appropriate in some cases, such as when a relatively high rate of reading words is employed.

Such pauses can significantly improve the understanding of a listener of the text being spoken by providing extra time for the listener to digest the content of the current segment. It should be noted that this will often result in pauses being placed between words in a sentence that are not separated by any punctuation mark, which is a key advantage of the system over the prior art.

In addition to speaking the text, the system may also highlight the spoken words in the text on a display visible to the user. By "highlight", we mean that a portion that is highlighted is visually distinguished from all other portions of text displayed. In the depicted embodiment, four classes of highlighting are used in the display so that every word on the screen is highlighted in one manner, with words in the same class being highlighted in the same manner. Highlighting may emphasize the highlighted text, e.g. making it the most prominent text displayed, or de-emphasize it, e.g. making it the least prominent text on the display. The differentiation may be achieved with boldness of the font, the colour, or the size, for example, or by techniques such as "de-focusing" text.

Figure 2B:
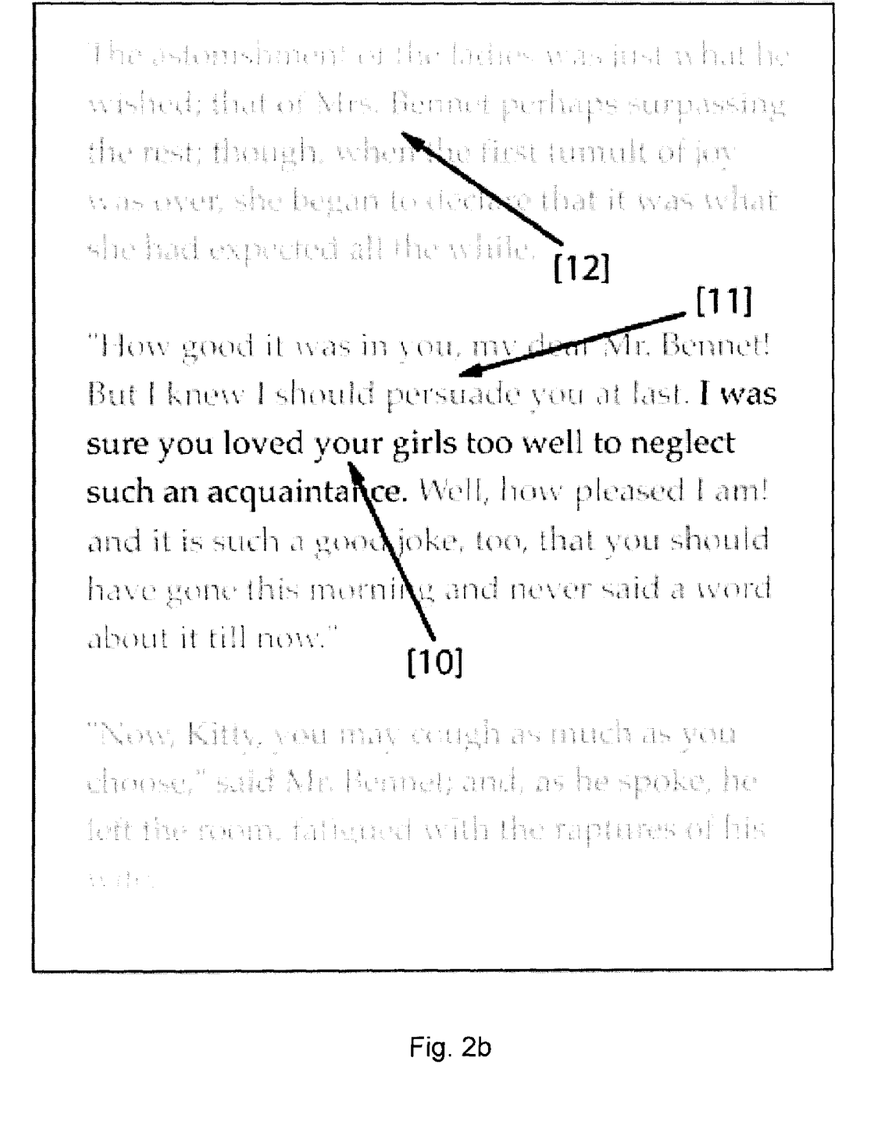

For example, all the text shown in FIG. 2a may be displayed at one time on a computer screen. As shown in FIG. 2b, the system may highlight the text of the sentence [10] that is currently being spoken by rendering it in a bold font that is bolder than the other text [11] in the same paragraph.

The remainder of the text [12] on the display, from the preceding or following paragraphs, may be shown in a faded manner so that it is less prominent that the other text [11] in the same paragraph as the current sentence [10]. This causes the reader who is listening to the current sentence [10] being spoken to focus on that sentence, but also provides context in the form of the rest of the paragraph [11], which is highlighted less prominently, and portions of other paragraphs [12] that are highlighted even less prominently than the remainder of the paragraph [11] containing the current sentence [10].

Figure 2C:
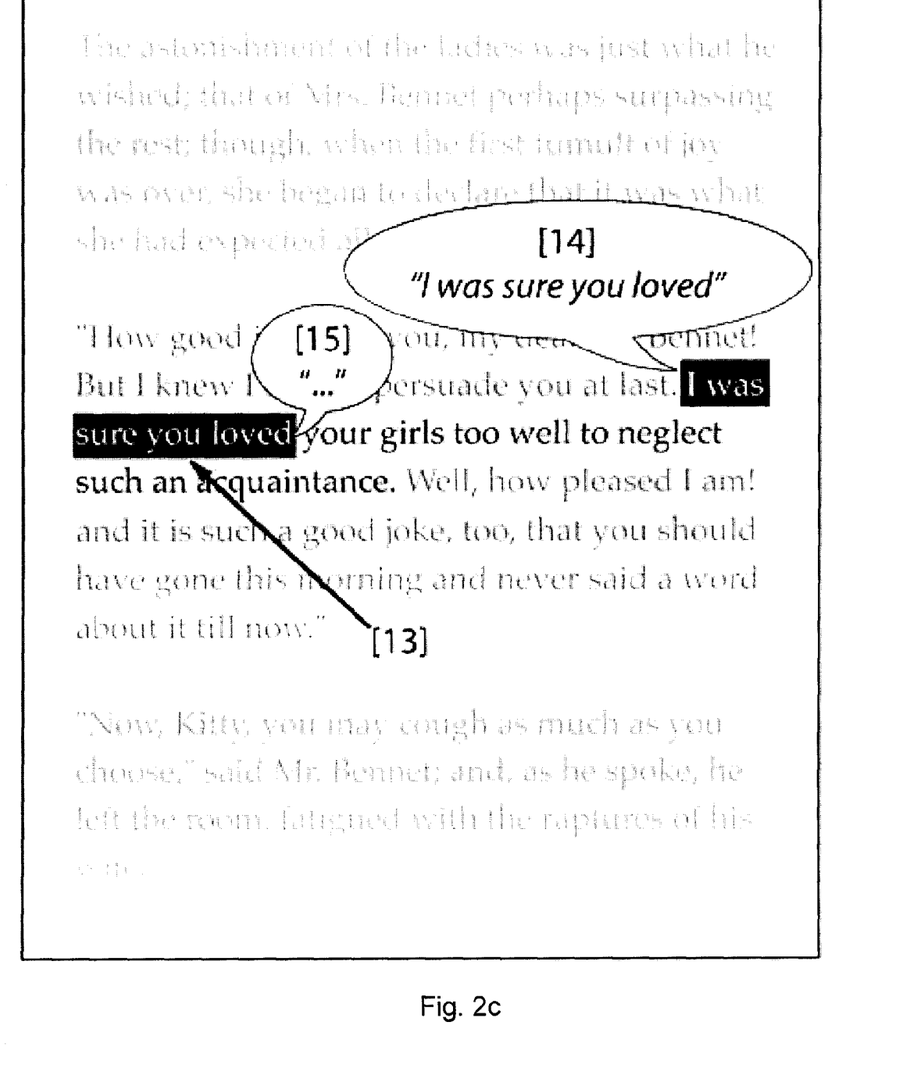

In addition, each phrasal segment [14] within the current sentence [10] that is currently being read/spoken by the TTS engine may be further highlighted [13] such as in the manner shown in FIG. 2c, so that it the most prominent portion of the display. Such a segment continues to be highlighted as the most prominent portion of the display for as long as it takes for the TTS engine to speak the words in that segment.

Figure 2D:
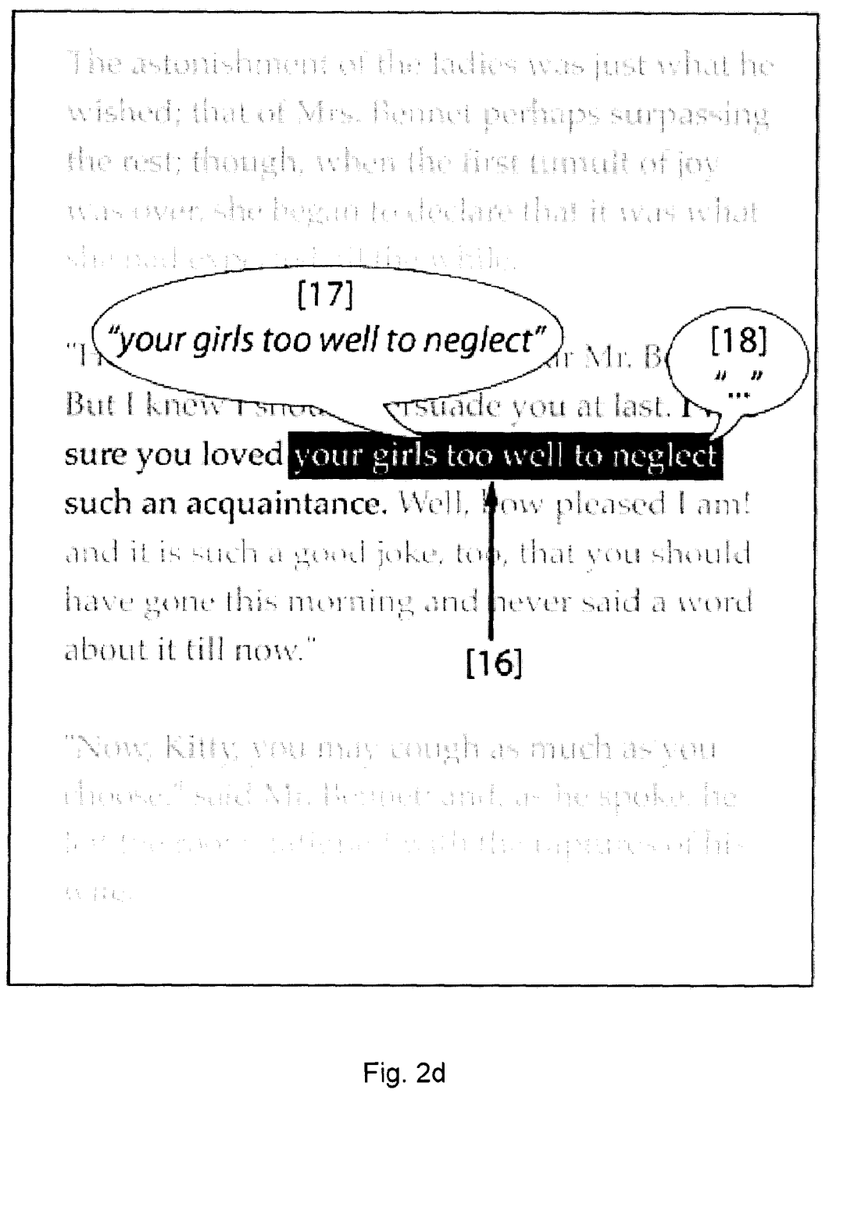

In FIG. 2c, the text for the phrasal segment [14] currently being spoken is rendered in white with a surrounding black background [13]. After the current phrasal segment [14] has been spoken, a pause [15] may be introduced, and then the next phrasal segment [17], as shown in FIG. 2d, may be fed to the TTS engine for speaking, and highlighted [16] on the screen in the same prominent manner in which the prior phrasal segment [14] had been highlighted, while the highlighting of the prior phrasal segment [14] is modified so that it is shown in the same manner (with the same form of highlighting) as the remainder of the current sentence. In this manner, the phrasal segment corresponding to the words currently being spoken by the TTS engine is always the most prominent portion of the display. When the last segment of a sentence has been spoken, the next sentence is then highlighted in the same manner that the previous sentence had been highlighted, and the previous sentence is then highlighted in the same manner as the remainder of the paragraph. Similarly, when the last segment of a paragraph has been spoken, the next sentence (in the next paragraph) is then highlighted as the previous sentence had been, and the remainder of the new paragraph is then highlighted as the remainder of the previous paragraph had been, and the highlighting of the previous paragraph is then modified to be the least prominent. The system may also scroll the display from time to time, or continuously, for example to keep the line(s) containing the current segment being read in the middle of the display.

In general, four distinct levels or classes of highlighting may be used as shown in FIGS. 2c and 2d where (1) the current phrasal segment [14] is most prominently highlighted, (2) the remainder of the sentence being spoken is less prominently highlighted, (3) the remainder of the paragraph containing that sentence is even less prominently highlighted than the remainder of the sentence being spoken, and (4) the remainder of the text on the display in previous or following paragraphs is least prominently highlighted (e.g. by being faded or de-focused). The method of highlighting shown in FIGS. 2c and 2d is a preferred method of providing such differential highlighting, but other approaches may rely on differences in colour, brightness and font size for example. It is also not necessary that the levels of highlighting be discrete. For example, other than for the current phrasal segment, the prominence (e.g. boldness) of words could be decreased proportionately with the distance of each word from the current phrasal segment.

Rather than speaking the words via an acoustic speaker to the user, the system may instead operate in a teleprompter mode, muting the sound and just highlighting each successive phrasal segment as described above. The TTS engine may still be employed to determine the timing so that the highlighting is moved between phrasal segments as described above in a manner suitable for the person to read the highlighted text, while pausing briefly between phrasal segments. The user may be provided with a control to increase or decrease the reading speed.

Figure 3A:
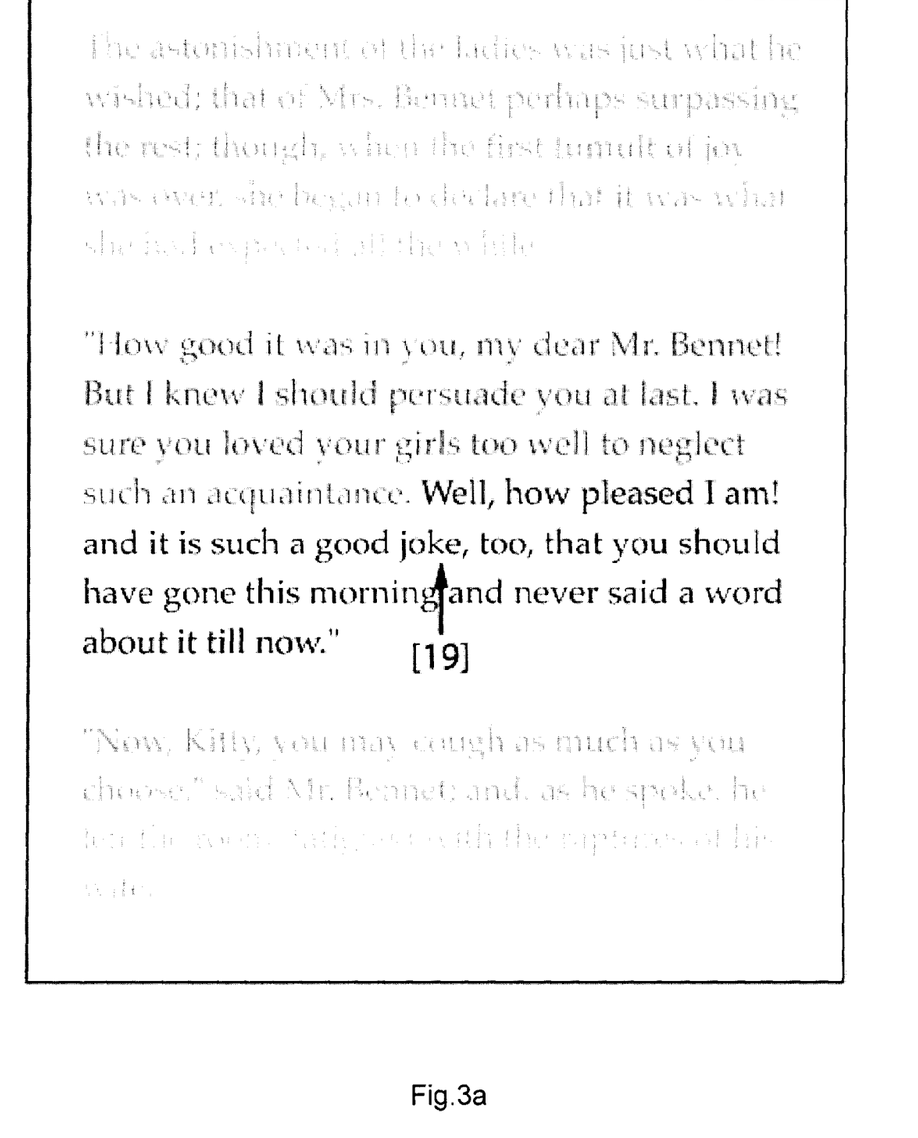
Figure 3B:
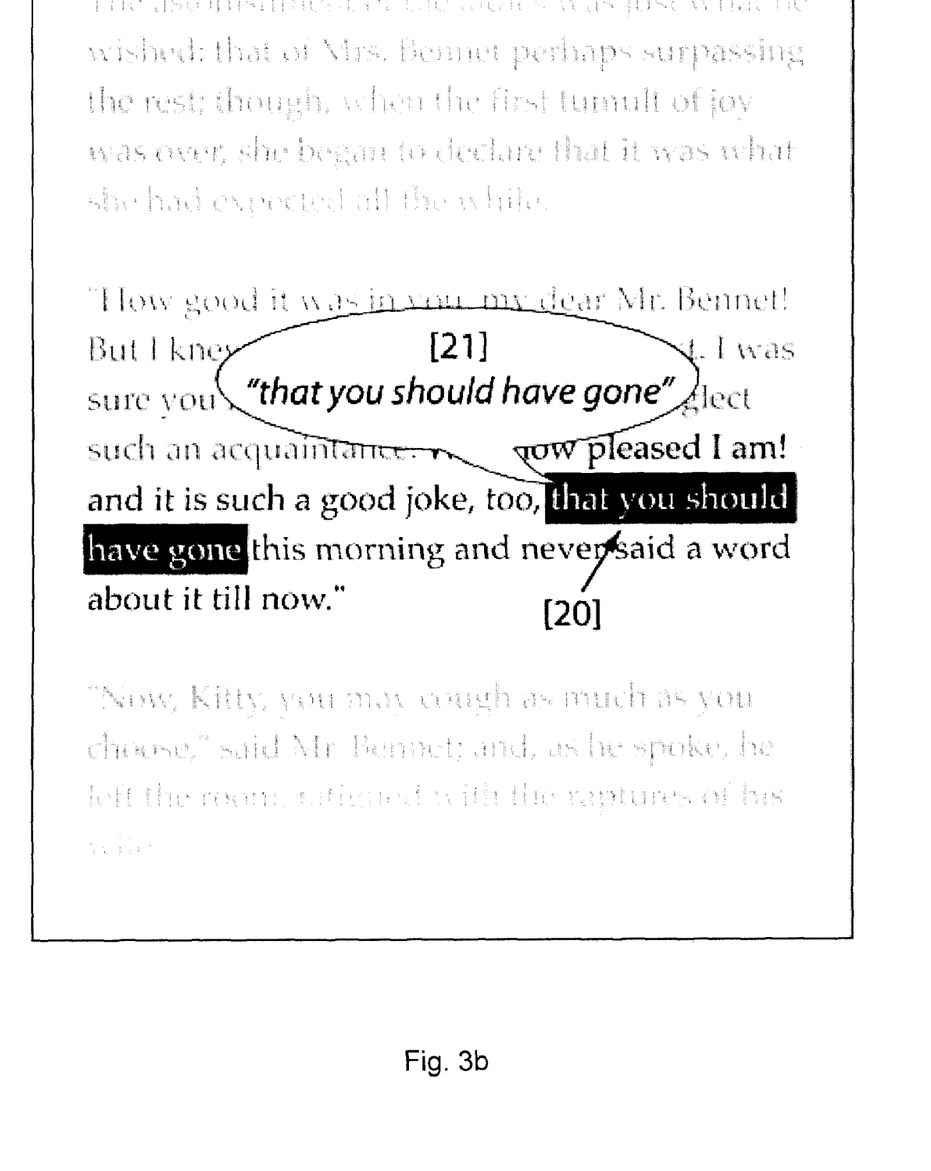

The system may also be used for non-linear reading. In this mode, the user may select a sentence such as by clicking on a word in the sentence with a mouse or using a touch screen. The system may then highlight the sentence [19] as shown in FIG. 3a and then may speak the sentence [19] via the TTS engine while highlighting [20] the segment [21] currently being spoken as shown in FIG. 3b and as described above.

Figure 3C:
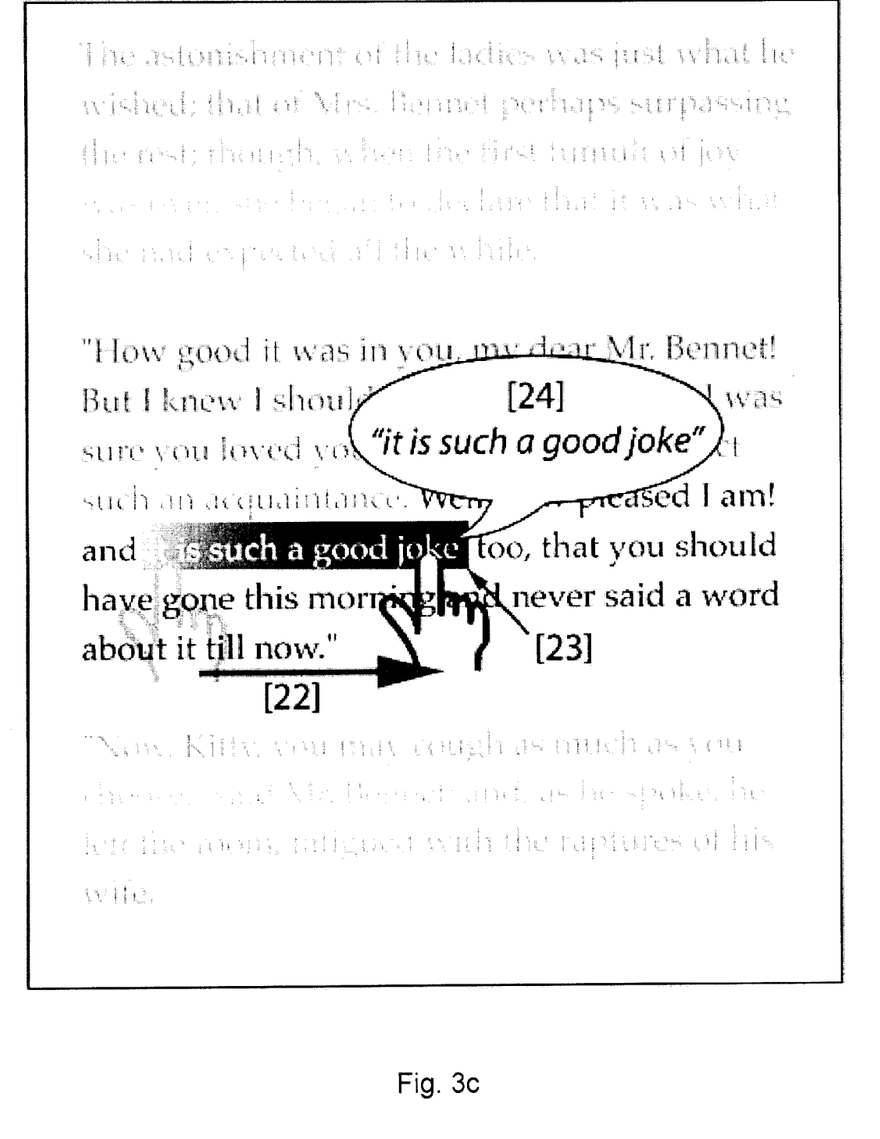
FIG. 3c a portion of text displayed by a processor with a segment of the text having been selected by a user and highlighted by the processor.

The system may further allow the user to select a segment within the sentence, for example by clicking again on a particular word, or swiping a number of words [22], as shown in FIG. 3c. The system may then highlight that segment [24] using the most prominent highlighting [23] as described above. The system may then use the TTS engine to speak the segment.

Generally, a computer, computer system, client or server, as will be well understood by a person skilled in the art, includes one or more computer processors, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Computer-readable memory, which may also be referred to as a computer-readable medium or a computer-readable storage medium, which terms have identical meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies but excludes transitory propagating signals so references to computer-readable memory exclude transitory propagating signals. Memory may be distributed such that at least two components are remote from one another, but are still all accessible by one or more processors. A nonvolatile computer-readable memory refers to a computer-readable memory that can retain information stored in the memory when it is not powered. A computer-readable memory is a physical, tangible object that is a composition of matter, and it cannot be construed as an "activity" of any nature whatsoever. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to the processors to cause the processors to perform computations, control other devices, receive input, send output, etc.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as", or is prefaced or followed by the expression "for example", or "e.g.", this is done to expressly convey and emphasize that the list is not exhaustive, irrespective of the length of the list. The absence of such an expression, or other similar expressions, is in no way intended to imply that a list is exhaustive. Unless otherwise expressly stated, such lists shall be read to include all comparable or equivalent variations of the items, and alternatives to the items, in the list that a skilled person would understand would be suitable for the purpose that the items are referenced.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

The invention claimed is:

1. A method of parsing a sentence into a sequence of phrasal segments, the method being performed by a computer processor, the method comprising the steps of:
   (a) providing a target segment length expressed as a number of words or syllables;
   (b) parsing, by the computer processor, the sentence to identify a plurality of candidate break points based on punctuation and parts of speech and including candidate break points at the beginning and end of the sentence; and
   (c) eliminating, by the computer processor, some of the candidate break points, leaving a plurality of final break points, so that every word in the sentence is situated between two final break points, and the sum of the differences between (i) the target segment length and (ii) the number of words, if the target segment length is expressed as a number of words, or the number of syllables, if the target segment length is expressed as a number of syllables, between each consecutive pair of final break points is minimal;
wherein each sequence of words situated between each consecutive pair of final break points is identified as a segment.

2. The method of claim 1, wherein the parsing of the sentence is performed by the computer processor based on a grammar.

3. The method of claim 1, wherein the parsing step comprises identifying words that are conjunctions, verbs and prepositions, and the parsing of the sentence comprises placing candidate break points at the beginning of the sentence, at punctuation marks in the sentence, and before and after each word identified as a conjunction, verb or preposition.

4. The method of claim 1, wherein the parsing step comprises a first sub-step of pre-processing the sentence to break it into fragments based on mid-sentence punctuation marks and including candidate break points at the beginning and end of each fragment, and a second sub-step of parsing each fragment to identify candidate break points based on punctuation and parts of speech.

5. The method of claim 4, wherein the parsing step comprises identifying words that are conjunctions, verbs and prepositions, and the parsing of the sentence further comprises placing candidate break points before and after each conjunction, verb and preposition.

6. The method of claim 3, wherein candidate break points are removed from before and after a conjunction, verb or preposition if the conjunction, verb or preposition is situated within a phrase that should not be broken.

7. The method of claim 6, wherein a phrase should not be broken if it is in a pre-determined set collected from external lexicographical sources.

8. A method for parsing a document, the document comprising one or more than one paragraph, each paragraph comprising one or more than one sentence, into a sequence of phrasal segments, the method being performed by a computer processor, the method comprising the steps of:
   (a) parsing, by the computer processor, the document into paragraphs based on paragraph breaks;
   (b) parsing, by the computer processor, the paragraphs into sentences based on punctuation; and
   (c) parsing, by the computer processor, each sentence into a sequence of phrasal segments using the method of claim 1.

9. A method of reading a document to a user, the method being performed by a computer processor, the method comprising the steps of:
- (a) parsing, by the computer processor, the document into a sequence of phrasal segments using the method of claim 8 and identifying one segment as a current segment;
- (b) instructing, by the computer processor, a text-to-speech engine to read the current segment aloud to the user;
- (c) pausing, by the computer processor, for a pre-determined duration after the current segment has been read, the duration being the inter-segment pause duration;
- (d) setting, by the computer processor, the current segment to be the next segment in the sequence; and
- (e) repeating steps (b), (c), and (d) until all segments have been read or until the user instructs the processor to stop.

10. The method of claim 9, wherein the inter-segment pause duration is discernibly longer than the average pause duration between words.

11. The method of claim 10, wherein a sentence, being the current sentence, containing the current segment is also displayed, and the current segment is highlighted to differentiate it from the remainder of the current sentence.

12. The method of claim 11, wherein at least a portion of a paragraph, being the current paragraph, containing the current segment is also displayed, and the current sentence is highlighted to differentiate it from the remainder of the current paragraph.

13. The method of claim 12, wherein a portion of the text preceding the current paragraph in the document is displayed before the current paragraph, and the current paragraph is highlighted to differentiate it from the text preceding the current paragraph.

14. The method of claim 12, wherein a portion of the text following the current paragraph in the document is displayed after the current paragraph, and the current paragraph is highlighted to differentiate it from the text following the current paragraph.

15. The method of claim 11, wherein the current segment is highlighted to be most prominent.

16. The method of claim 11, wherein the reading is muted so that no words are sounded.

17. The method of claim 9, wherein the inter-segment pause duration is at least 500 milliseconds.

18. The method of claim 9, wherein the inter-segment pause duration for each pair of segments, other than the pauses between sentences, is the same.

19. The method of claim 9, wherein the current segment is displayed to the user while the text-to-speech engine reads the current segment.

20. A system comprising a programmable computer processor and a display, the processor running software adapted to parse a sentence into a sequence of phrasal segments based on a pre-determined target segment length expressed as a number of words or syllables by:
- (a) parsing the sentence to identify a plurality of candidate break points based on punctuation and parts of speech and including candidate break points at the beginning and end of the sentence; and
- (b) eliminating some of the candidate break points, leaving a plurality of final break points, so that every word in the sentence is situated between two final break points, and the sum of the differences between (i) the target segment length and (ii) the number of words, if the target segment length is expressed as a number of words, or the number of syllables, if the target segment length is expressed as a number of syllables, between each consecutive pair of final break points is minimal;

wherein each sequence of words situated between each consecutive pair of final break points is identified as a segment.

* * * * *